J. F. MEIGS & H. G. JAKOBSSON.
TRAINING AND ELEVATING MECHANISM FOR GUNS.
APPLICATION FILED JULY 15, 1908.

1,156,541.

Patented Oct. 12, 1915.
3 SHEETS—SHEET 1.

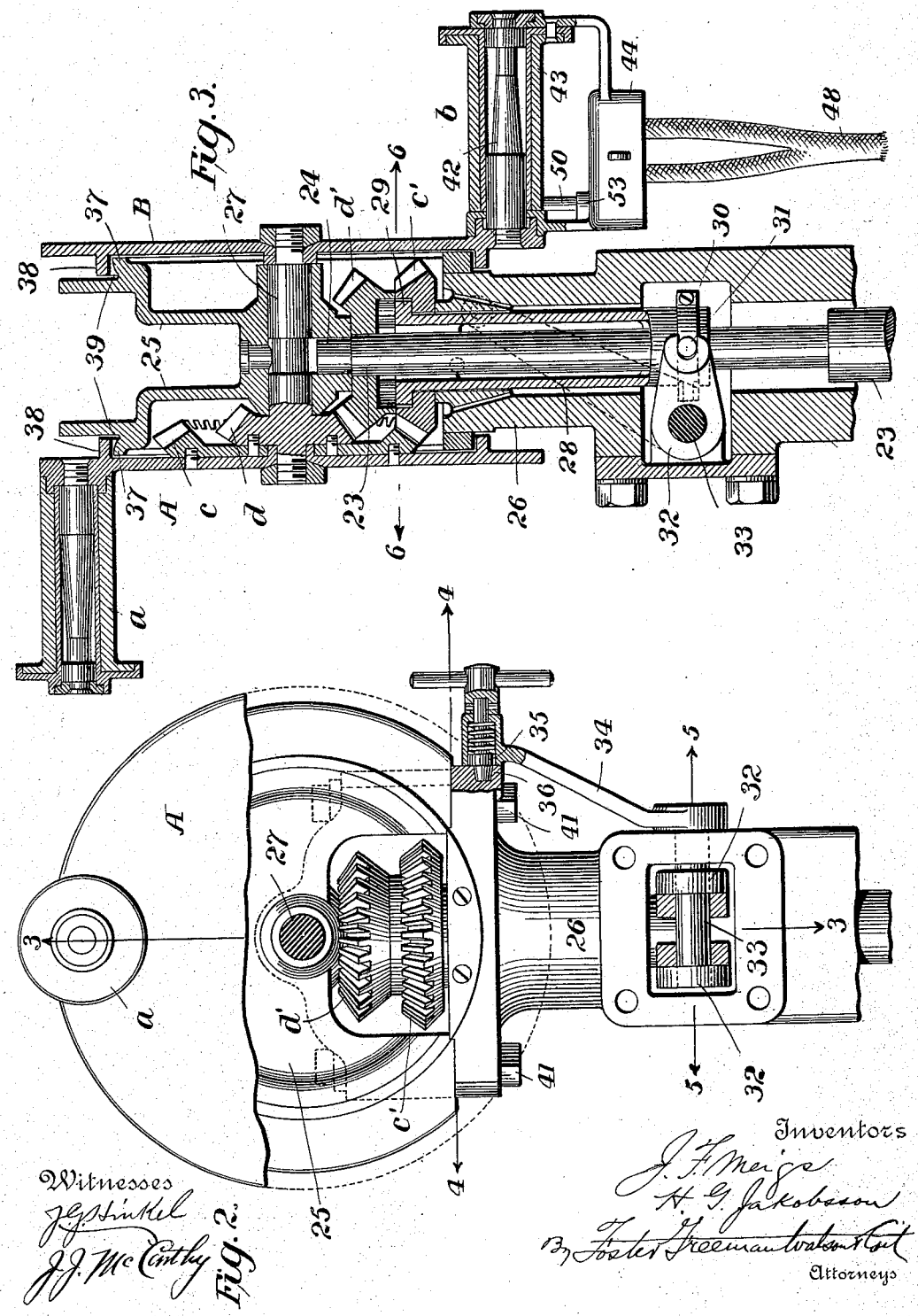

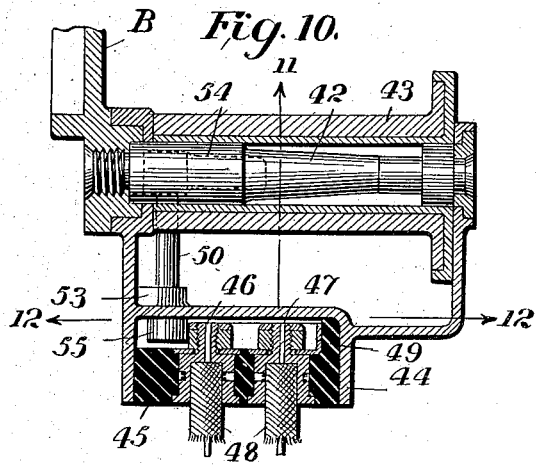
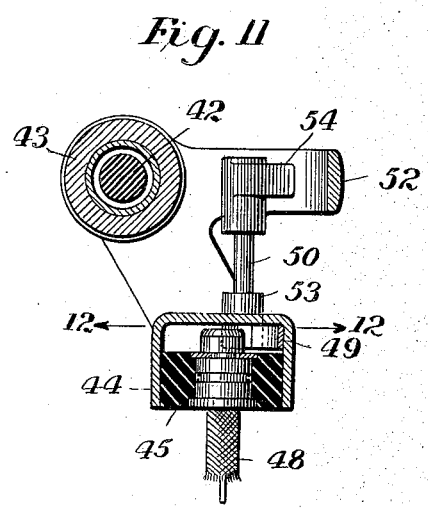
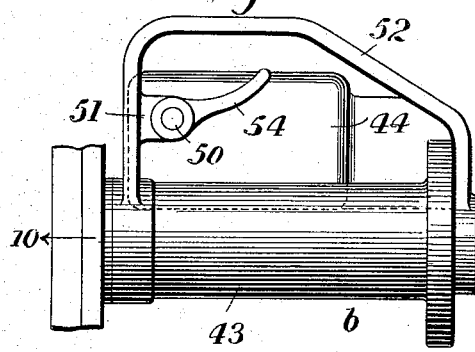
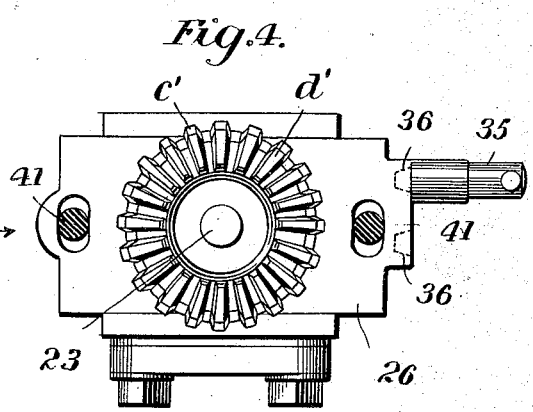
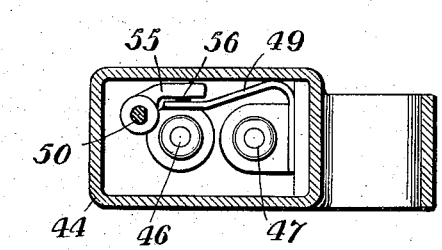
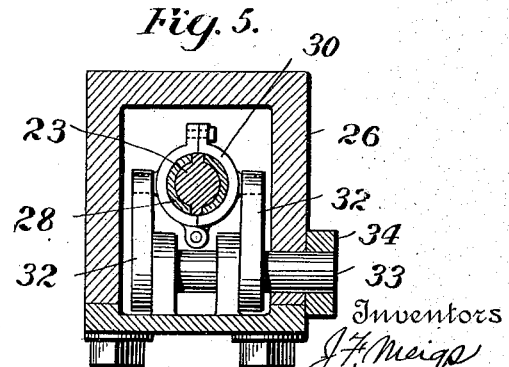

UNITED STATES PATENT OFFICE.

JOHN F. MEIGS AND HERMAN G. JAKOBSSON, OF SOUTH BETHLEHEM, PENNSYLVANIA, ASSIGNORS TO BETHLEHEM STEEL COMPANY, OF SOUTH BETHLEHEM, PENNSYLVANIA, A CORPORATION OF PENNSYLVANIA.

TRAINING AND ELEVATING MECHANISM FOR GUNS.

1,156,541. Specification of Letters Patent. Patented Oct. 12, 1915.

Application filed July 15, 1908. Serial No. 443,700.

*To all whom it may concern:*

Be it known that we, JOHN F. MEIGS and HERMAN G. JAKOBSSON, a citizen of the United States and subject of the King of Sweden, respectively, and residents of South Bethlehem, Northampton county, State of Pennsylvania, have invented certain new and useful Improvements in Training and Elevating Mechanism for Guns, of which the following is a specification.

This invention relates to improvements in training, elevating and firing mechanism for guns.

One feature particularly relating to the training and elevating mechanism comprises an adjustable standard for the hand wheels whereby the planes in which the hand wheels turn may be adjusted about a vertical axis. This is particularly valuable in connection with the double hand wheels having handles which travel simultaneously in opposite directions such as are described in Letters Patent No. 785,966. In this class of training and elevating mechanism there is not much room for working the inner hand wheel and the room may be increased by adjusting the standard so that the planes of the hand wheels are at a slight angle to the axis of the gun. By making the standard for the hand wheels adjustable, the hand wheels can be adjusted variably to suit different gunners so that they can be more at ease in operating the gun.

Another feature of the invention consists in a variable speed mechanism whereby either the training or the elevating mechanism, or both, may be operated at different speeds as compared with the speed of the hand wheels to suit the requirements of different conditions. That is, the gunner may follow a rapidly moving object or target either in elevation or azimuth without a correspondingly rapid movement of the hand wheels by throwing in a higher speed set of gears, or he may follow a slowly moving object without materially changing the speed of his hand wheel by throwing the other gears into connection with the hand wheels.

The invention further consists in a simplified electric firing means connected with one of the operating handles.

Figure 1:
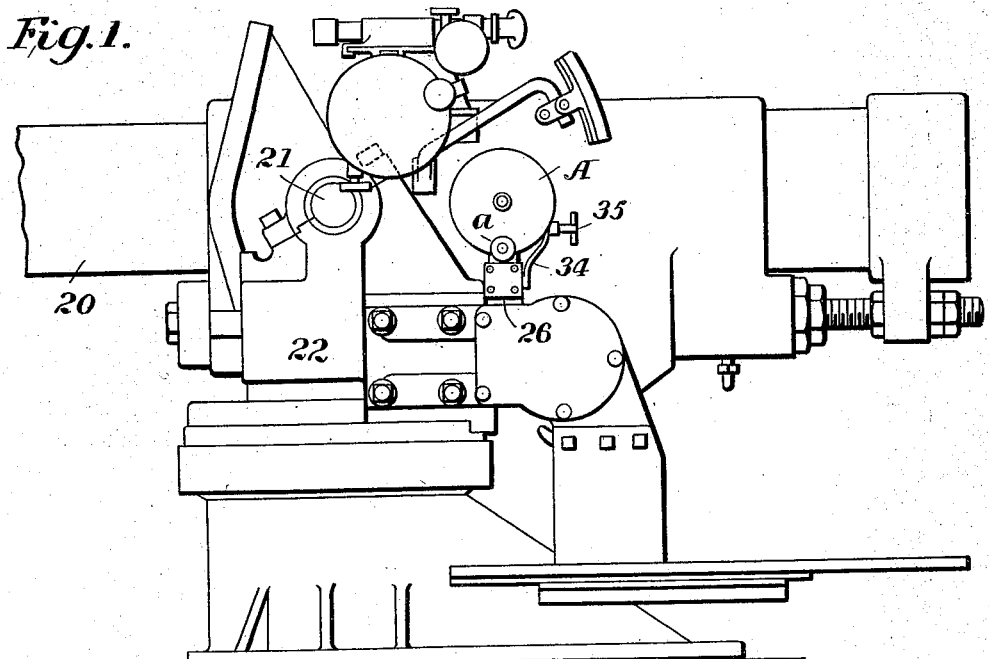
Figure 6:
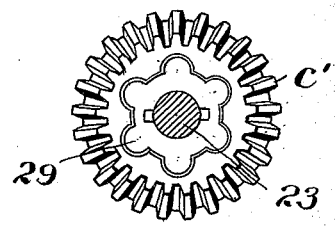
Figure 7:
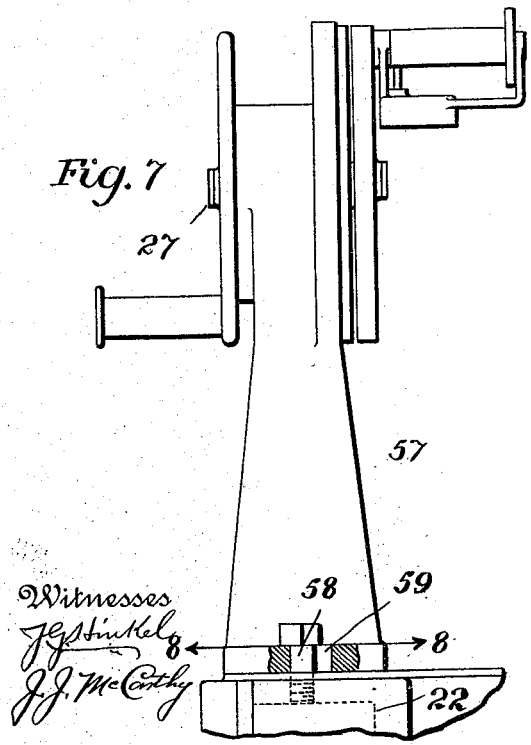
Figure 8:
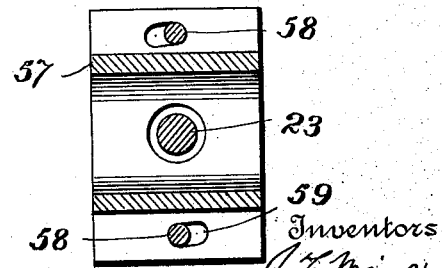

The invention will be described in connection with the accompanying drawing, in which;

Figure 1 is a side view of a portion of the gun embodying the present invention; Fig. 2 is an enlarged side view of the hand wheel standard and hand wheels; Fig. 3 is a sectional view of the same on the line 3 of Fig. 2; Fig. 4 is a plan view of the base or column of the standard taken on the line 4 of Fig. 2; Fig. 5 is a section on the line 5 of Figs. 2 and 3; Fig. 6 is a section on the line 6 of Fig. 3; Fig. 7 illustrates a modified form of standard for the hand wheels; Fig. 8 is a plan view of the base of the standard shown in Fig. 7, partly in section on the line 8 of Fig. 7; Fig. 9 is a plan view of the handle of the right hand drive wheel shown in Fig. 3, showing the trigger of the firing mechanism; Fig. 10 is a section on the line 10 of Fig. 9; Fig. 11 is a section on the line 11 of Fig. 10; Fig. 12 is a section on the line 12 of Figs. 10 and 11.

Referring to Fig. 1 of the drawing, 20 indicates the gun tube which is hung on trunnions 21 supported upon a suitable carriage or base 22. It will be understood that the gun is provided with suitable gearing for moving it about its vertical and horizontal axes for training and elevating, it being unnecessary to illustrate such gearing in detail for the purposes of the present application.

Referring to Figs. 2 to 5 inclusive, 23 indicates a shaft which is driven by hand wheel mechanism to be hereinafter described and which in turn is connected with the training or elevating mechanism to drive the same. The upper end of the drive shaft 23 has a bearing 24 in a bracket 25 which is adjustably mounted on a standard 26 through which the shaft passes. A horizontal shaft 27 is also mounted in bearings in the bracket 25 and rigidly connected with this horizontal shaft are two hand wheels or crank disks A, B, provided respectively with relatively rotatable handles *a, b*. Rigidly connected with the crank disk A are two bevel gears *c, d*, which intermesh respectively with bevel gears *c', d'*, adapted to rotate freely about the axis of the shaft 23. Either of the gears *c, d*, may be rigidly connected with the shaft 23, at will, by means of a clutch device which may be of any suitable character. As shown, a sleeve 28 surrounds the shaft 23 and is free to slide vertically thereon, but compelled to turn with said shaft by means of a suitable spline. On the upper end of the sleeve 28 is a toothed wheel or flange 29 which is adapted to interlock with complementary teeth formed in recesses in the upper and lower sides respectively of the gears $c'$, $d'$. When the sleeve 28 is in its lower position it interlocks the gear $c'$ with the shaft 23 and the shaft is driven by the gear $c$ at the higher of the two rates of speed provided by the means illustrated and when the sleeve 28 is interlocked with the gear $d'$, the shaft 23 is driven by the smaller gear $d$ at a lower rate of speed as compared with the speed of the crank disks. The sleeve 28 may be adjusted into engagement with either of the gears $c'$, $d'$, by any suitable means. As shown a collar 30 on the lower end of the sleeve is provided with trunnions 31 which are engaged by arms 32 fixed on a rock shaft 33. On the outer end of the shaft 33 is an arm or lever 34 by means of which the shaft is rocked and the sleeve 28 is shifted up or down. The end of the arm 34 is provided with a spring latch 35 which is adapted to engage either one of two openings 36 to hold the sleeve in either its upper or lower position. It will be seen that the speed of the driving mechanism can be instantly changed simply by shifting the latch 35 from one opening 36 to the other.

It will be seen that the gears are incased and protected from the weather, dust, etc., by means of the crank wheels which are solid disks and the bracket 25. This bracket has two flanges 37, contiguous to the crank disks and the crank disks are provided with overlapping flanges 38. The flanges 37 are preferably provided with grooves or gutters 39 in their outer faces, as shown in Fig. 3, to carry off rain or other water and prevent its entrance into the gear case. The bracket 25 which carries the crank disks is adjustable about the axis of the shaft 23 and may be secured in any desired adjustment. As shown this adjustment is effected by providing slots in the upper plate of the standard 26, as shown in Fig. 4. Bolts 41 extend downwardly through the bracket 25 and the slots and rigidly connect the bracket with its standard, the bolts being movable in the slots to adjust the angle of the hand wheels with respect to the gun. One of the handles, presumably the right hand handle $b$, is provided with a simple and effective form of electric firing mechanism as follows: Referring to Figs. 9 to 12, 42 indicates the spindle of the handle which is fixed to the crank disk B and 43 the handle proper, which revolves about the spindle. Connected with the handle is a casing 44 containing a block of insulating material 45 which receives the terminals 46, 47, of conducting wires extending to the means for exploding the charge in the gun. These wires prefer-ably hang loosely from the handle and are joined into a single cable 48, as shown in Fig. 3, being, of course, insulated from each other in said cable. The wires may be connected to the terminal posts or contacts 46, 47, in any suitable manner. The casing 44 is closed on its top and sides, opening only at the bottom, and the terminals are therefore thoroughly protected. Connected with the terminal 47 is a spring plate 49, the free end of which stands normally in proximity to the terminal 46, but out of contact therewith. Convenient means are provided for bringing the plate 49 into contact with the terminal 46 as follows: A vertical trigger shaft 50 has its upper end mounted in a bracket 51 extending inward from a guard plate or band 52 and its lower end extending through a bearing 53 in the upper plate of the box or casing 44. Upon the upper end of the shaft 51 is fixed an arm or trigger 54 which is conveniently situated to be engaged by the forefinger of the hand which grasps the handle $b$. Upon the lower end of shaft 50 is an arm 55 which is adapted to engage the spring plate 49 and press it against the terminal 46 when the shaft 50 is rocked, thus electrically connecting the terminals 46, 47, and effecting the firing of the gun in a well known manner. To prevent leakage of the current a piece of insulating material 56 is placed between the arm 55 and the spring plate 49, being connected to one or other of said parts.

It will be evident that various modifications or changes of the foregoing apparatus may be made without departing from the spirit or scope of the invention. Thus in Figs. 7 and 8 we have illustrated a modification in which the crank shaft 27 is mounted in the upper part of a standard 57 which is adjustably carried by the base or carriage 22 of the gun, being connected thereto by bolts 58 passing through slots 59. This standard 57 is broadly the equivalent of the standard 26 and the bracket 25. It will also be evident that various forms of change-speed gears may be substituted for those illustrated and described and that the mechanical details of the firing handle may also be modified in various ways without departing from the invention, and furthermore that speeds are not limited to two, but might be three or even more, depending on the number of gears that are used.

Having described the invention what is claimed is,

1. In training mechanism for guns, the combination with a gun and its sighting devices, of a crank shaft mounted in a suitable bearing, and means for adjusting said shaft about an intersecting axis perpendicular thereto.

2. In training mechanism for guns, the combination with a gun and its sighting devices, of a crank shaft mounted in a suitable bearing and provided with two oppositely disposed crank handles, and means for adjusting said crank shaft and bearing about an intersecting axis perpendicular thereto.

3. In training mechanism for guns, the combination with a gun and its sighting devices, of a crank shaft mounted in a suitable bearing and provided with two oppositely disposed crank handles, and means for adjusting said crank shaft and bearing about an intersecting axis perpendicular thereto to vary the planes of movement of the crank handles relatively to the gun.

4. In training mechanism for guns, the combination with a gun and its mount of a drive shaft, a crank shaft connected with the drive shaft by bevel gearing, and means for adjusting the crank shaft about the axis of the drive shaft, whereby its relation to the gun is changed without changing its relation to the drive shaft.

5. In training mechanism for guns, the combination with a gun and its mount of a standard, a drive shaft adapted to turn in said standard, a bracket mounted on said standard and capable of adjustment about the axis of the drive shaft, a crank shaft mounted in said bracket, and gearing connecting said crank shaft and drive shaft.

6. In training mechanism for guns, the combination with a gun and its mount, of a standard, a drive shaft adapted to turn in said standard, a bracket mounted on said standard and capable of adjustment about the axis of the drive shaft, a crank shaft mounted in said bracket, and a plurality of sets of gears adapted to connect the crank shaft and the drive shaft for the purpose of varying the speed of the drive shaft relative to the crank shaft.

7. In training mechanism for guns, a crank shaft having an operating handle, a housing connected to said handle and having an opening only in one side thereof, an electric circuit comprising flexible conductors having their terminals in said housing, a circuit closer in said housing, and a trigger outside of the housing and in juxtaposition to the operating handle and having connections for operating said circuit closer.

8. In training mechanism for guns, a crank shaft having an operating handle, a housing swiveled on said handle and having an opening only in one side thereof, an electric circuit comprising flexible conductors having their terminals in said housing, a circuit closer in said housing, a rock shaft extending through the housing and having thereon an arm within the housing for operating the circuit closer, and a trigger in juxtaposition to said handle and located outside of the housing.

9. In training mechanism for guns, a crank handle, a trigger mounted on said crank handle, a flexible conductor depending freely from the handle and having terminals connected to said crank handle, a circuit closer for connecting said terminals, and means for connecting said trigger with said circuit closer for operating the latter.

In testimony whereof we affix our signatures in presence of two witnesses.

JOHN F. MEIGS.
HERMAN G. JAKOBSSON.

Witnesses:
EDWIN A. MILLER,
HARVEY L. NIESS.

Copies of this patent may be obtained for five cents each, by addressing the "Commissioner of Patents, Washington, D. C."